US009672115B2

(12) United States Patent
Earl et al.

(10) Patent No.: US 9,672,115 B2
(45) Date of Patent: Jun. 6, 2017

(54) PARTITION TOLERANCE IN CLUSTER MEMBERSHIP MANAGEMENT

(71) Applicant: VMware, Inc., Palo Alto, CA (US)

(72) Inventors: William Earl, Burien, WA (US); Christos Karamanolis, Los Gatos, CA (US); Gregory A. Smith, Palo Alto, CA (US); Eric Knauft, Palo Alto, CA (US); Pascal Renauld, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 440 days.

(21) Appl. No.: 14/209,426

(22) Filed: Mar. 13, 2014

(65) Prior Publication Data

US 2015/0058298 A1 Feb. 26, 2015

Related U.S. Application Data

(60) Provisional application No. 61/870,167, filed on Aug. 26, 2013.

(51) Int. Cl.
*G06F 17/30* (2006.01)
*G06F 11/14* (2006.01)
(Continued)

(52) U.S. Cl.
CPC ...... *G06F 11/1464* (2013.01); *G06F 11/1425* (2013.01); *G06F 11/1484* (2013.01);
(Continued)

(58) Field of Classification Search
CPC ......... G06F 17/30091; G06F 17/30194; G06F 17/30584; G06F 17/30575; G06F 17/30578; G06F 15/17331
(Continued)

(56) References Cited

U.S. PATENT DOCUMENTS 6,314,526 B1  11/2001  Arendt et al.
6,553,389 B1  4/2003  Golding et al.
(Continued)

FOREIGN PATENT DOCUMENTS

JP       6-110766    4/1994
JP    2009-217475    4/2002
(Continued)

OTHER PUBLICATIONS

International Search Report and Written Opinion dated Dec. 8, 2014, International Application No. PCT/US2014/041172, 15pages.
(Continued)

*Primary Examiner* — Thu-Nguyet Le

(57) ABSTRACT

Techniques are disclosed for managing a cluster of computing nodes following a division of the cluster into at least a first and second partition, where the cluster aggregates local storage resources of the nodes to provide an object store, and objects stored in the object store are divided into data components stored across the nodes. In accordance with one method, it is determined that a majority of data components comprising a first object are stored within nodes in the first partition. It is determined that a majority of data components comprising a second object are stored within nodes in the second partition. Configuration objects are permitted to be performed on the first object in the first partition while denying access to the first object from the second partition, and on the second object in the second partition while denying access to the second object from the first partition.

30 Claims, 7 Drawing Sheets

(51) Int. Cl.
*G06F 11/20* (2006.01)
*H04L 29/08* (2006.01)

(52) U.S. Cl.
CPC ...... *G06F 11/202* (2013.01); *G06F 17/30091* (2013.01); *H04L 29/08* (2013.01)

(58) Field of Classification Search
USPC .......................................................... 707/823
See application file for complete search history.

(56) References Cited

U.S. PATENT DOCUMENTS

| | | | |
|---|---|---|---|
| 6,658,473 | B1 | 12/2003 | Block et al. |
| 6,839,752 | B1 | 1/2005 | Miller et al. |
| 7,360,030 | B1 | 4/2008 | Georgiev |
| 7,669,029 | B1 | 2/2010 | Mishra et al. |
| 7,716,425 | B1 | 5/2010 | Uysal et al. |
| 8,074,003 | B1 | 12/2011 | Salamon et al. |
| 8,103,769 | B1 | 1/2012 | Weiser et al. |
| 8,127,059 | B1 | 2/2012 | Carr et al. |
| 8,453,036 | B1 | 5/2013 | Goel et al. |
| 8,635,422 | B1 | 1/2014 | Kaliannan et al. |
| 8,682,916 | B2 | 3/2014 | Wong et al. |
| 8,843,925 | B1 | 9/2014 | Beda, III et al. |
| 8,954,979 | B1 | 2/2015 | Myers et al. |
| 8,984,243 | B1 | 3/2015 | Chen et al. |
| 9,015,123 | B1 | 4/2015 | Mathew et al. |
| 9,020,912 | B1 | 4/2015 | Majee et al. |
| 9,298,715 | B2 | 3/2016 | Kumarasamy et al. |
| 2002/0188590 | A1* | 12/2002 | Curran et al. ........ G06F 3/0622 |
| 2003/0131020 | A1* | 7/2003 | Karamanolis ..... G06F 17/30067 |
| 2003/0158836 | A1 | 8/2003 | Venkatesh et al. |
| 2003/0204509 | A1* | 10/2003 | Dinker .............. G06F 17/30575 |
| 2004/0054648 | A1 | 3/2004 | Mogi et al. |
| 2004/0136379 | A1 | 7/2004 | Liao |
| 2004/0177228 | A1 | 9/2004 | Leonhardt et al. |
| 2004/0215639 | A1* | 10/2004 | Bamford .............. G06F 9/5083 |
| 2005/0097073 | A1 | 5/2005 | Mair et al. |
| 2005/0166011 | A1 | 7/2005 | Burnett et al. |
| 2005/0240714 | A1 | 10/2005 | McCauley et al. |
| 2006/0218360 | A1 | 9/2006 | Burkey |
| 2007/0055703 | A1 | 3/2007 | Zimran et al. |
| 2009/0172666 | A1 | 7/2009 | Yahalom et al. |
| 2009/0271412 | A1 | 10/2009 | Lacapra et al. |
| 2009/0276566 | A1 | 11/2009 | Coatney et al. |
| 2010/0153966 | A1 | 6/2010 | Arimilli et al. |
| 2010/0299495 | A1 | 11/2010 | Frank |
| 2010/0306280 | A1* | 12/2010 | Sapek .............. G06F 17/30607 707/803 |
| 2011/0083131 | A1 | 4/2011 | Pirzada et al. |
| 2011/0087631 | A1 | 4/2011 | Feldman et al. |
| 2011/0238814 | A1 | 9/2011 | Pitts |
| 2011/0238857 | A1 | 9/2011 | Certain et al. |
| 2012/0137066 | A1 | 5/2012 | Nolterieke et al. |
| 2012/0204176 | A1 | 8/2012 | Tian et al. |
| 2012/0239896 | A1* | 9/2012 | Sobel .................... G06F 3/0608 711/165 |
| 2012/0303322 | A1 | 11/2012 | Rego et al. |
| 2013/0204849 | A1 | 8/2013 | Chacko |
| 2013/0311989 | A1 | 11/2013 | Ota et al. |
| 2014/0115579 | A1 | 4/2014 | Kong |
| 2014/0130055 | A1 | 5/2014 | Guha |
| 2014/0156925 | A1 | 6/2014 | Baron et al. |
| 2014/0173226 | A1 | 6/2014 | Gold |
| 2014/0173612 | A1 | 6/2014 | Haydock et al. |
| 2014/0201152 | A1 | 7/2014 | Kumarasamy et al. |
| 2014/0201736 | A1 | 7/2014 | Mizrahi et al. |

FOREIGN PATENT DOCUMENTS

| | | |
|---|---|---|
| JP | 2008-527555 | 7/2008 |
| JP | 2008-210057 | 9/2008 |
| JP | 2008-541207 | 11/2008 |
| JP | 2002-108567 | 9/2009 |
| JP | 2010-044789 | 2/2010 |
| JP | 2010-055369 | 3/2010 |
| JP | 2010-186223 | 8/2010 |
| JP | 2010-186472 | 8/2010 |
| JP | 2012-173996 | 9/2012 |
| WO | 2008109321 A1 | 9/2008 |
| WO | 2010048048 A2 | 4/2010 |
| WO | 2011/108027 A1 | 9/2011 |
| WO | 2012/090247 A1 | 7/2012 |
| WO | 2012/104912 A1 | 8/2012 |

OTHER PUBLICATIONS

Adam et al., "Regeneration with Virtual Copies for Replicated Databases," [Proceedings of the International Conference on Distributed Computing Systems], Los Alamitos, IEEE Comp. Soc. Press, US. vol. CONF. 11, May 20, 1991, p. 429-436.

Hu et al., "Performance Evaluation of Dynamic Supporting Algorithms," Proceedings of the Annual International Computer Software and Applications Conference (COMPSAC), Los Alamitos, IEEE Comp., vol. CONF. 16, Sep. 21, 1992, pp. 90-95.

"Virtual Drive", Web Page, http://searchservervirtualization.techtarget.com/definition/virtual-drive>, Jun. 14, 2012, retrieved from Internet Archive Wayback Machine, https://web.archive.org/web/20120614001609/http://searchservervirtualization.techtarget.com/definition/virtual-drive> on Feb. 3, 2016.

Jacek Migdal. 2011. Data Block Encoding of KeyValues (aka delta encoding I prefix compression). The Apache Software Foundation HBase. https://issues.apache.org/jira/browse/HBASE-4218.

Jonathan Gray. 2009. Concurrent LRU Block Cache. The Apache Software Foundation HBase. https://issues.apache.org/jira/browse/HBASE-1460.

Bishwaranjan Bhattacharjee, Lipyeow Lim, Timothy Malkemus, George Mihaila, Kenneth Ross, Sherman Lau, Cathy McArthur, Zoltan Toth, and Reza Sherkat. 2009. Efficient index compression in DB2 LUW. Proc. VLDB Endow. 2, 2 (Aug. 2009), 1462-1473. DOI= 10.14778/1687553.1687573 http://dx.doi.org/1 0.14 778/1687553.1687573.

International Search Report and Written Opinion dated Oct. 17, 2014, International Application No. PCT/US2014/041761, 10 pages.

International Search Report and Written Opinion dated Sep. 5, 2014, International Application No. PCT/US2014/041757, 8 pages.

International Search Report and Written Opinion dated Sep. 1, 2014, International Application No. PCT/US2014/041764, 11 pages.

International Search Report and Written Opinion dated Oct. 1, 2014, International Application No. PCT/US2014/041164, 9 pages.

Direct Attached Storage. Article [online]. Apex Microsystems, 2009 [retrieved on May 4, 2016]. Retrieved from the Internet <http://www.apexmicrosystem.com/?page_id+518>.

Australian Office Action received in Australian Patent Application No. 2014311781, filed on Feb. 4, 2016. 2 pages.

Translation of Japanese Office Action received in Japanese Patent Application No. 2016-531609. 7 pages.

Australian Office Action received in Australian Patent Application No. 2014311869. 4 pages.

Adam, N. et al. "Regeneration with Virtual Copies for Replicated Databases." International Conference on Distributed Computing Systems. Arlington, Texas, May 20-24, 1991; [Proceedings of the International Conference on Distributed Computing Systems], Los Alamitos, IEEE Comp. Soc. Press. pp. 429-436.

Hu, P. et al. "Performance Evaluation of Dynamic Supporting Algorithms." Proceedings of the Annual International Computer Software and Applications Conference (COMPSAC). Chicago, Sep. 21-25, 1992; [Proceedings of the Annual International Computer Software and Applications Conference (COMPSAC)], Los Alamitos, IEEE. pp. 90-95.

Vocabulary.com. Article [online]. Vocabulary.com, Sep. 2012 [retrieved on Aug. 30, 2016]. Retrieved from the Internet <https://web.archive.org/web/20120910033525/http://www.vocabulary.com/dictionary/incorporate>.

Translation of Japanese Office Action received in Japanese Patent Application No. 2016-529769. 7 pages.

(56) References Cited

OTHER PUBLICATIONS

Translation of Japanese Office Action received in Japanese Patent Application No. 2016-529765. 7 pages.
Translation of Japanese Office Action received in Japanese Patent Application No. 2016-529768. 12 pages.

* cited by examiner

PARTITION TOLERANCE IN CLUSTER MEMBERSHIP MANAGEMENT

CROSS-REFERENCE TO RELATED APPLICATIONS

This application claims priority to U.S. Provisional Application Ser. No. 61/870,167, filed Aug. 26, 2013, which is incorporated by reference herein in its entirety. This application is also related to the following commonly assigned, non-provisional applications: "Distributed Policy-Based Provisioning and Enforcement for Quality of Service" (Ser. No. 14/010,247), "Load Balancing of Resources" (Ser. No. 14/010,275), "Scalable Distributed Storage Architecture" (Ser. No. 14/010,293), and "Virtual Disk Blueprints for a Virtualized Storage Area Network" (Ser. No. 14/010,316), each of which was filed on Aug. 26, 2013. Each related application is incorporated by reference herein in its entirety.

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation. Because the shared local disks that make up the datastore may have different performance characteristics (e.g., capacity, input/output operations per second or IOPS capabilities, etc.), usage of such shared local disks to store virtual disks or portions thereof may be distributed among the virtual machines based on the needs of each given virtual machine.

This approach provides enterprises with cost-effective performance. For instance, distributed storage using pooled local disks is inexpensive, highly scalable, and relatively simple to manage. Because such distributed storage can use commodity disks in the cluster, enterprises do not need to invest in additional storage infrastructure. However, one issue that arises with a datastore that is backed by the local storage of a "cluster" of host computers (or "nodes") is that one or more nodes can fail, become inactive or otherwise go offline, such that the nodes are no longer visible to the other nodes in the cluster. For example, a cluster may subdivide into a number of "partitions" of sub-clusters because of failures or mis-configurations in the network that connect the nodes. Node failures are often indistinguishable from network partitions, making this partitioning effect difficult to diagnose and respond to. Referred to as a "split brain" situation, the nodes within particular partitions caused by node failures may continue to communicate normally but fail to communicate across nodes in other partitions. In such a "split brain" situation, nodes in different partitions may execute operations that access or modify their local copy of data without coordination with nodes in other partitions, resulting in inconsistent or inaccurate data across the entire cluster. To avoid such issues, existing distributed storage systems allow for at most one partition of cluster to be functional at any point in time. However, this approach is conservative and may disallow access to certain data which, given the data's particular distribution and replication characteristics within the various nodes of the cluster, could be safely accessed within a particular partition.

SUMMARY

One or more embodiments disclosed herein provide a method for managing a cluster of computing nodes following a failure or management event that divides the cluster into at least a first partition and a second partition, where the cluster aggregates local storage resources of each of the computing nodes to provide an object store, and where objects stored in the object store are divided into data components stored across the computing nodes. The method generally includes determining that a majority of data components that comprise a first object stored in the object store are stored within computing nodes in the first partition. The method also includes determining that a majority of data components that comprise a second object stored in the object store are stored within computing nodes in the second partition. The method includes permitting configuration operations to be performed on the first object in the first partition while denying any access to the first object from the second partition. The method also includes permitting configuration operations to be performed on the second object in the second partition while denying any access to the second object from the first partition.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Embodiments disclosed herein provide techniques for tolerating multiple partitions of nodes in a cluster in the event of a failure event such as a node or network failure or network or other type of misconfiguration. Each node in the cluster contributes local storage to provide an aggregate object store in which portions or "components" of an object stored in the object store may be backed by the storage of different nodes in the cluster. As further detailed below, upon a failure event that results in the partitioning of the cluster, the techniques herein evaluate the accessibility of data stored in the cluster on a "per-object" basis rather than denying complete access to any particular partitions to prevent split-brain scenarios. As further detailed below, techniques herein enable concurrent partitions to co-exist and execute operations on objects that have a quorum (e.g., a majority) of its components residing in a given partition. An "owner" node for an object determines whether a quorum exists for an object and, if so, coordinates access to the object within the partition.

Reference is now made in detail to several embodiments, examples of which are illustrated in the accompanying figures. Note, that wherever practicable, similar or like reference numbers may be used in the figures and may indicate similar or like functionality. The figures depict embodiments for purposes of illustration only. One of skill in the art will readily recognize from the following description that alternative embodiments of the structures and methods illustrated herein may be employed without departing from the principles described herein.

In the following, an example of a software-defined storage area network in a virtualized computing environment is used as a reference example of tolerating cluster partitions in a distributed resources system. This reference example is included to provide an understanding of the embodiments described herein. However, it will be apparent to one of skill in the art that embodiments may be adapted for use in other contexts related to cluster partition tolerance with regard to shared resources.

Similarly, numerous specific details are provided to provide a thorough understanding of the embodiments. One of skill in the art will recognize that the embodiments may be practiced without some of these specific details. In other instances, well known process operations and implementation details have not been described in detail to avoid unnecessary obscuring novel aspects of the disclosure.

Figure 1:
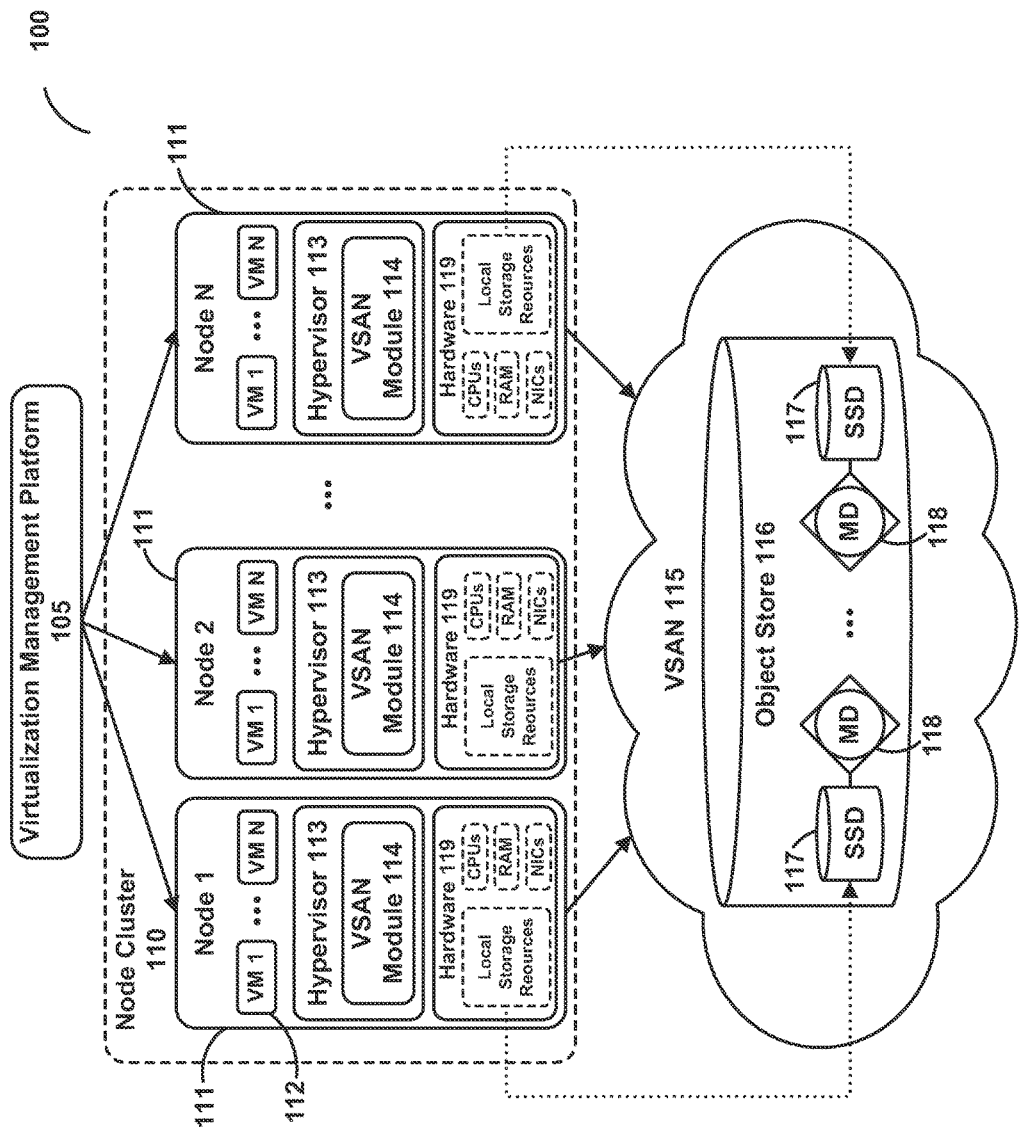
FIG. 1 illustrates an example computing environment, according to one embodiment.

FIG. 1 illustrates a computing environment 100, according to one embodiment. As shown, computing environment 100 is a software-based "virtual storage area network" (VSAN) environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of solid state drives (SSDs) 117, magnetic or spinning disks 118 and/or any other type of non-volatile memory. In certain embodiments, SSDs 117 serve as a read cache and/or write buffer in front of magnetic disks 118 to increase I/O performance. As further discussed below, each node 111 may include a storage management module (referred to herein as a "VSAN module") in order to automate storage management workflows (e.g., create objects in the object store, etc.) and provide access to objects in the object store (e.g., handle I/O operations to objects in the object store, etc.) based on predefined storage policies specified for objects in the object store. For example, because a VM may be initially configured by an administrator to have specific storage requirements for its "virtual disk" depending its intended use (e.g., capacity, availability, IOPS, etc.), the administrator may define a storage profile or policy for each VM specifying such availability, capacity, IOPS, and the like. As further described below, the VSAN module may then create an "object" for the specified virtual disk by backing it with physical storage resources of the object store based on the defined policy.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described further below, each hypervisor 113, through its corresponding VSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110. In a particular embodiment, vSphere Hypervisor from VMware, Inc. (VMware) may be installed on nodes 111 as hypervisor 113 and vCenter Server from VMware may be used as virtualization management platform 105.

In one embodiment, VSAN module 114 is implemented as a "VSAN" device driver within hypervisor 113. In such an embodiment, VSAN module 114 provides access to a conceptual "VSAN" 115 through which an administrator can create a number of top-level "device" or namespace objects that are backed by object store 116. In one common scenario, during creation of a namespace object, the administrator may specify a particular file system for the namespace object (such namespace objects hereinafter also thus referred to "file system objects"). For example, in one embodiment, each hypervisor 113 in each node 111 may, during a boot process, discover a /vsan/ root node for a conceptual global namespace that is exposed by VSAN module 114. By, for example, accessing APIs exposed by VSAN module 114, hypervisor 113 can then determine all the top-level file system objects (or other types of top-level namespace objects) currently residing in VSAN 115. When a VM (or other client) attempts to access one of the file system objects, hypervisor 113 may dynamically "auto-mount" the file system object at that time. A file system object (e.g., /vsan/fs_name1, etc.) that is accessible through VSAN 115 may, for example, store metadata relating to other data (e.g., files of the file system) stored in object store 116 consistent with the semantics of a particular file system such as VMware's distributed or clustered file system, VMFS, which is designed to provide concurrency control among simultaneously accessing hosts. Such a VMFS file system object would then be able to interact (e.g., like a virtual storage device) with a VMFS file system driver in hypervisor 113 in a manner similar to a physical storage device that was formatted in accordance with VMFS. Because VSAN 115 supports multiple file system objects, it is able to provide storage resources through object store 116 without being confined by limitations of any particular clustered file system. For example, many clustered file systems (e.g., VMFS, etc.) can only scale to support a certain amount of nodes 111. By providing multiple top-level file system object support, VSAN 115 overcomes the scalability limitations of such clustered file systems.

As described in further detail in the context of FIG. 2 below, a file system object may itself provide access to a number of virtual disk descriptor files (e.g., .vmdk files in a vSphere environment, etc.) accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that, as described further below, is further composed of "component" objects (again separately backed by object store 116) that reflect the storage requirements (e.g., capacity, availability, IOPS, etc.) of a corresponding storage profile or policy generated by the administrator when initially creating the virtual disk. As further discussed below, each VSAN module 114 (through a cluster monitoring, membership and directory services or "CMMDS" sub-module, in embodiments as further described below) communicates with other VSAN modules 114 of other nodes 111 to create and maintain an in-memory metadata database (e.g., maintained separately but in synchronized fashion in the memory of each node 111) that contains metadata describing the locations, configurations, policies, and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a distributed object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

Figure 2:
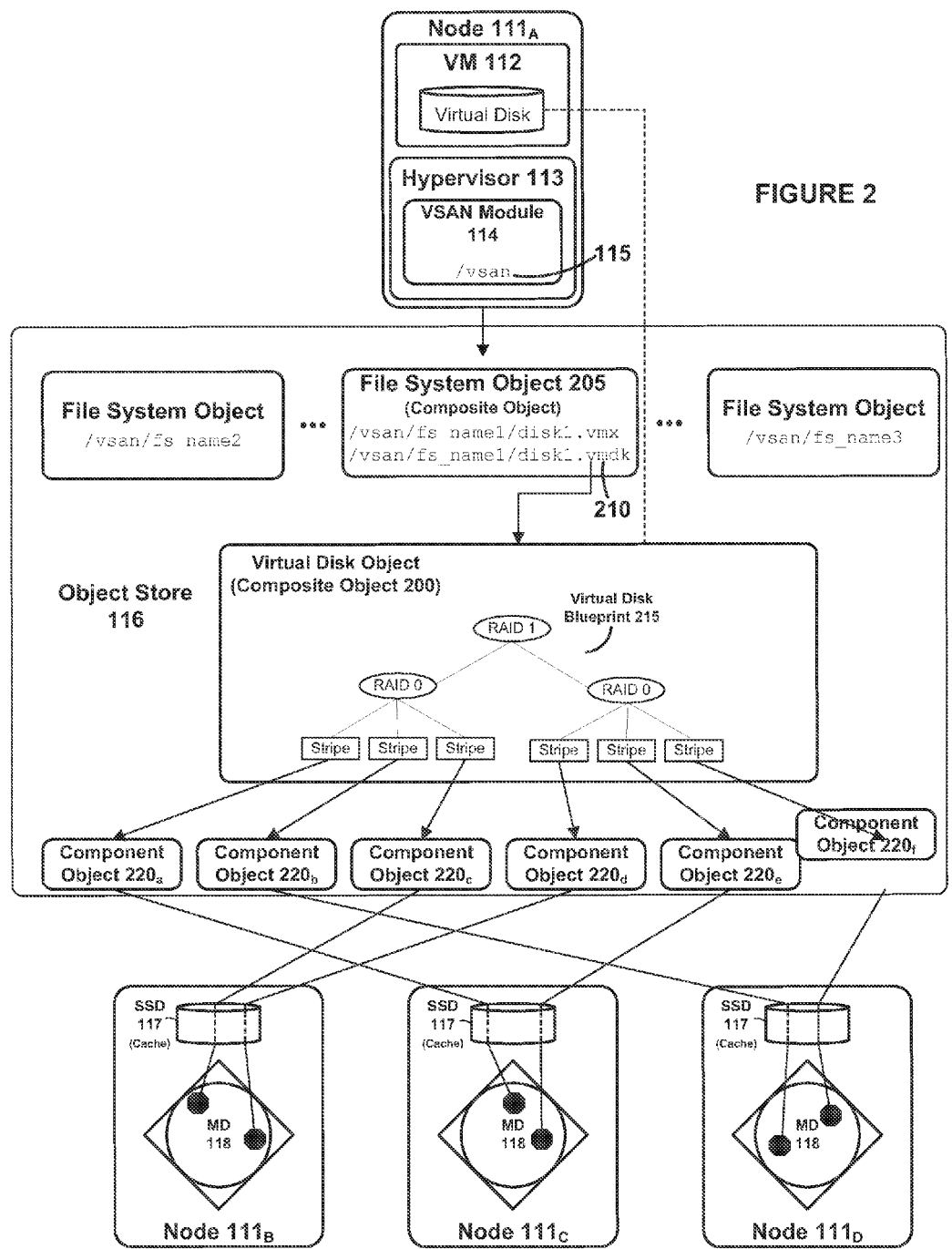
FIG. 2 illustrates an example hierarchical structure of objects organized within an object store that represent a virtual disk, according to one embodiment.

FIG. 2 illustrates an example hierarchical structure of objects organized within object store 116 that represent a virtual disk, according to one embodiment. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object, as previously discussed, in one embodiment). For example, VSAN module 114, by querying its local copy of the in-memory metadata database, is able to identify a particular file system object 205 (e.g., a VMFS file system object in one embodiment, etc.) stored in VSAN 115 that, as further described below, stores metadata or a descriptor file 210 for the virtual disk (e.g., a .vmdk file, etc.). It should be recognized that the file system object 205 may store a variety of other metadata or descriptor files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk. For example, in the embodiment of FIG. 2, composite object 200 includes a virtual disk blueprint 215 that describes a RAID 1 configuration where two mirrored copies of the virtual disk (e.g., mirrors) are each further striped in a RAID 0 configuration. Composite object 225 may thus contain references to a number of "leaf" or "component" objects $220_x$ corresponding to each stripe (e.g., data partition of the virtual disk) in each of the virtual disk mirrors. The metadata accessible by VSAN module 114 in the in-memory metadata database for each component object 220 (e.g., for each stripe) provides a mapping to or otherwise identifies a particular node $111_x$ in cluster 110 that houses the physical storage resources (e.g., magnetic disks 118, etc.) that actually store the stripe (as well as the location of the stripe within such physical resource).

Figure 3:
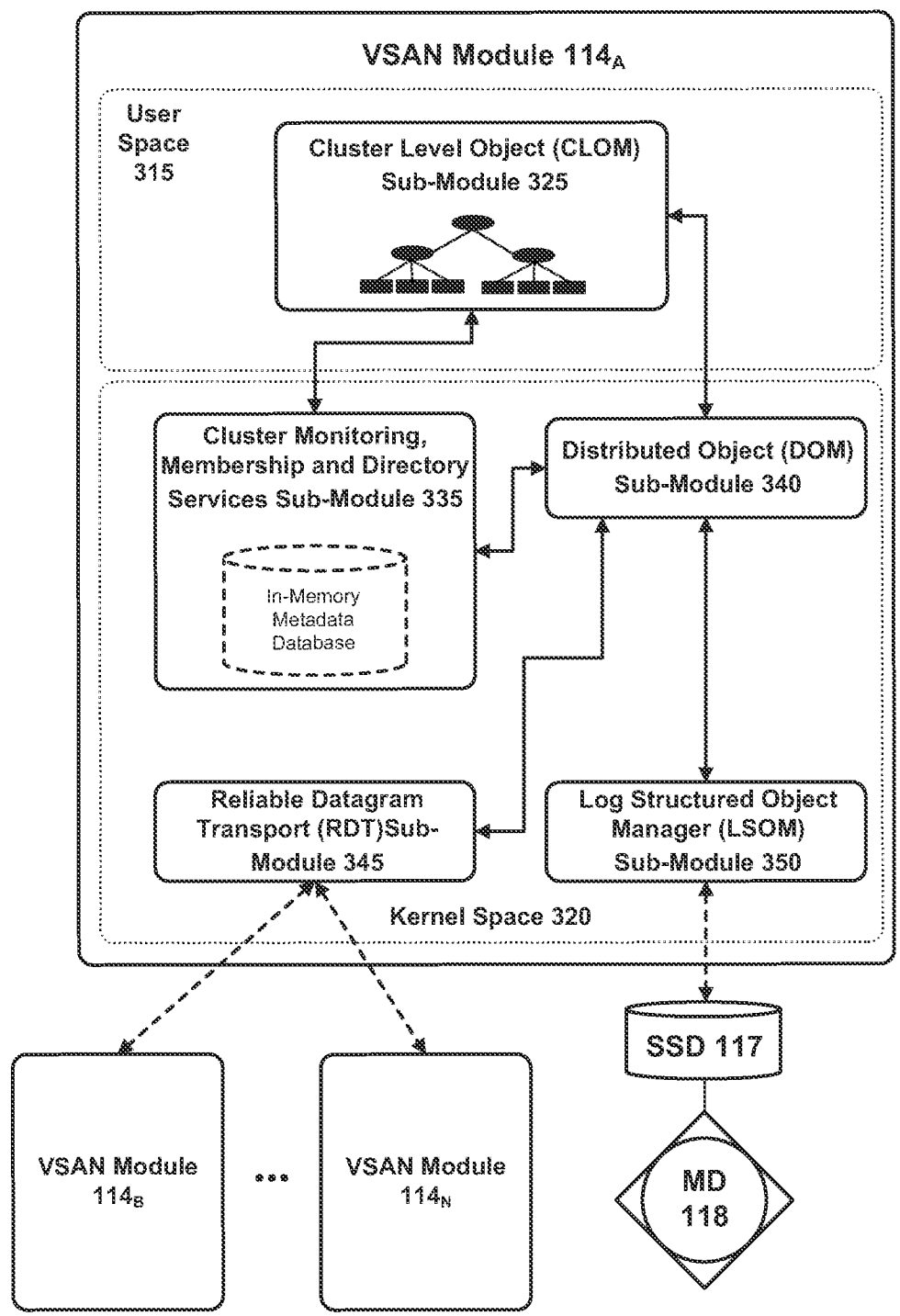
FIG. 3 illustrates components of a VSAN module, according to one embodiment.

FIG. 3 illustrates components of a VSAN module 114, according to one embodiment. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In one embodiment, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/stripes of the virtual disk to achieve load balancing, etc.). For example, CLOM sub-module 325, in one embodiment, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object store 116 to implement the blueprint by, for example, allocating or otherwise mapping component objects (e.g., stripes) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and their corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., stripes) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node 111 (or nodes) that serves as the coordinator for the particular component object (e.g., stripe, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of the node running the VM would also have to communicate across the network with the DOM sub-module 340 of the coordinator for the virtual disk object. In certain embodiments, if the VM issuing the I/O operation resides on node that is different from the coordinator of the virtual disk object subject to the I/O operation, the two DOM sub-modules 340 of the two nodes may to communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which nodes 111 should serve as the coordinators for the virtual disk object as well as its corresponding component objects (stripes, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

Figure 4:
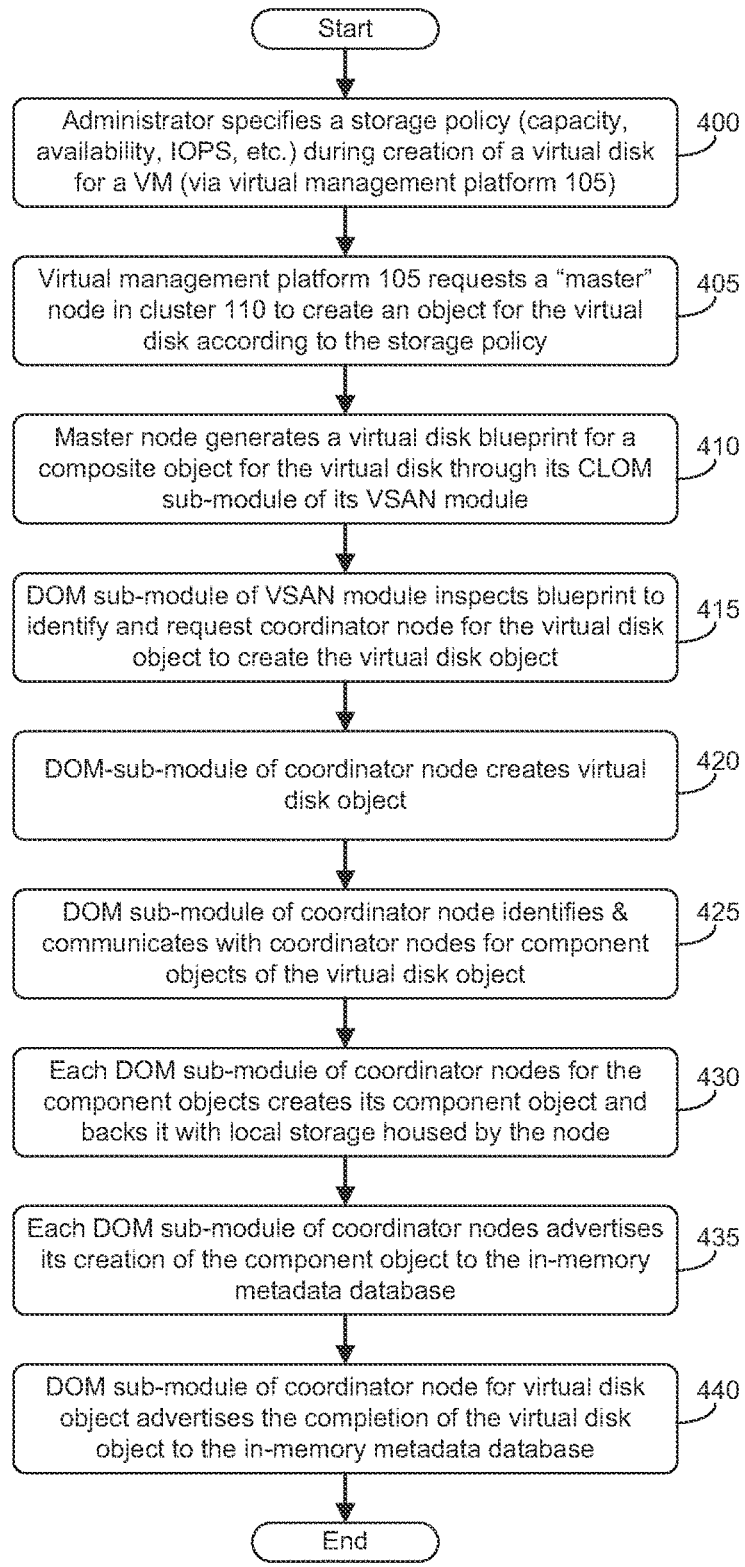
FIG. 4 illustrates a method flow diagram for creating a virtual disk object based on a defined storage policy, according to one embodiment.

FIG. 4 illustrates a method flow diagram for creating a virtual disk object based on a defined storage policy, according to one embodiment. For example, in step 400, an administrator may interact with a user interface of virtual management platform 105 to create a virtual disk having capacity, availability and IOPS requirements (e.g., the defined storage policy). In one embodiment, virtual management platform 105 may then request a "master" node 111 to create an object for the virtual disk in step 405. In step 410, such a master node 111 may generate a virtual disk blueprint through its CLOM sub-module 325 in VSAN module. As previously discussed, CLOM sub-module 325 generates a virtual disk blueprint for the creation of a virtual disk object (e.g., a composite object) based on the status of cluster 110 as determined by consulting the in-memory metadata database of CMMDS sub-module 335. The virtual disk blueprint may identify a particular node that should serve as the coordinator or owner of the virtual disk object. In step 415, the DOM sub-module 340 of the master node 111 may the request the DOM sub-module 340 of the identified node to create the virtual disk object. In step 420, the DOM sub-module 340 of the identified node receives the request and creates the virtual disk object, by, for example, communicating with its corresponding the LSOM sub-module 350 to persistently store metadata describing the virtual disk object in its local storage. In step 425, the DOM sub-module 340, based on the virtual disk object blueprint, identifies those others nodes in cluster 110 that have been designated to serve as the coordinator or owner for any component objects in the virtual disk blueprint. The DOM sub-module 340 communicates (e.g., using its RDT sub-module 345) with the DOM sub-modules 340 of the other nodes that will serve as coordinators for the component objects and store the data backing such component objects in their local storage. When such DOM sub-modules 340 receive a request from the DOM sub-module 340 of the coordinator of the virtual disk object to create their respective component objects, they, in turn, in step 430, communicate with their respective LSOM modules 350 to allocate local storage for the component object (and its related metadata). Once such component objects have been created, their DOM sub-modules 340 advertise the creation of the components to the in-memory metadata database of its CMMDS sub-module 335 in step 435. In step 440, in turn, the DOM sub-module 340 for the coordinator of the virtual disk object also advertises its creation to its CMMDS sub-module 335 to update the in-memory metadata database and ultimately transmits an acknowledgement to the administrator (e.g., via the master node communications back to virtual management platform 105). In one embodiment, the DOM sub-modules 340 for the coordinator of the virtual disk object and the coordinators for each component object of the virtual disk object further subscribe to or register "callbacks" with their corresponding CMMDS sub-modules 335 to be notified of relevant events or changes to the state of the cluster 110 (as continuously monitored by the CMMDS sub-modules 335) that would affect the virtual disk object or related component objects (e.g., node disappears, local disk disappears, etc.). For example, if the CMMDS sub-module 335 for the coordinator of the virtual disk object discovers that a particular node serving as the coordinator for one of the component objects for the virtual disk object is no longer reachable (e.g., due to a node failure or other reason), the CMMDS sub-module 335 notifies its corresponding DOM sub-module 340 through the callback mechanism. Similarly, if the CMMDS sub-module 335 for the coordinator of a component object of the virtual disk object discovers that a particular node serving as the coordinator for the virtual disk object (or any other component object of the virtual disk object) is no longer reachable, such CMMDS sub-module 335 similarly notifies its corresponding DOM sub-module 340 through the callback mechanism. Such a callback mechanism enables the DOM sub-modules 340 of the nodes in cluster 110 to take actions, as further described below, to make certain objects accessible or available in certain partitions of cluster 110 that may be created, for example, by node failure or any other event.

In certain embodiments, the advertising performed by coordinator nodes in steps 435 and 440 (as well as any other updates made by the coordinator nodes to their local versions of in-memory metadata) is implemented by communicating with a "leader" or "master" node for cluster 110 (which may be the same master node described earlier above in certain embodiments). The leader node maintains a true version of the in-memory metadata database, receives such advertised updates from all the various VSAN modules 114, imposes a total order on such updates and then propagates the updates to the VSAN modules 114 of the nodes in cluster 110 (including the node that advertised the update itself), which are then able to consistently and reliably update their local versions of the in-memory metadata database in the order imposed by the leader node. In one embodiment, CMMDS sub-module 335 of each VSAN module 114 includes a protocol for electing the leader node within cluster 110. Upon creation of cluster 110, CMMDS sub-modules 335 of each node in cluster 110 communicate with one another to elect the leader node. In addition to propagating updates to the various nodes in the cluster, in certain embodiments, the leader node may be further responsible for synchronizing new nodes and publishing node reachability and cluster information through the in-memory metadata database. Once elected, the leader node appoints a backup leader node to become the leader node if the current leader node fails. In one embodiment, each update received by the leader node is first synchronized with the backup leader node before it is sent to the rest of the nodes in the cluster.

In the event that cluster 110 becomes partitioned, for example, due to a node or network failure or a node going offline, the nodes of each partition similarly elect a new leader and/or backup leader node for the partition if, for example, such partition includes neither the leader nor the backup leader nodes respectively. As previously discussed, because CMMDS sub-modules 335 monitor the status, accessibility, and visibility of each node in cluster 110, the CMMDS sub-modules 335 of nodes 111 collectively recognize a node or network failure that causes one or more partitions to appear within cluster 110 and appropriately elect new leader and/or backup leader nodes for the partitions as previously discussed. CMMDS sub-modules 335 may determine that a node belongs to or is a member of a partition if and only if such node can communicate with the other nodes (and vice versa) such that recognized partitions have non-overlapping membership.

Figure 5:
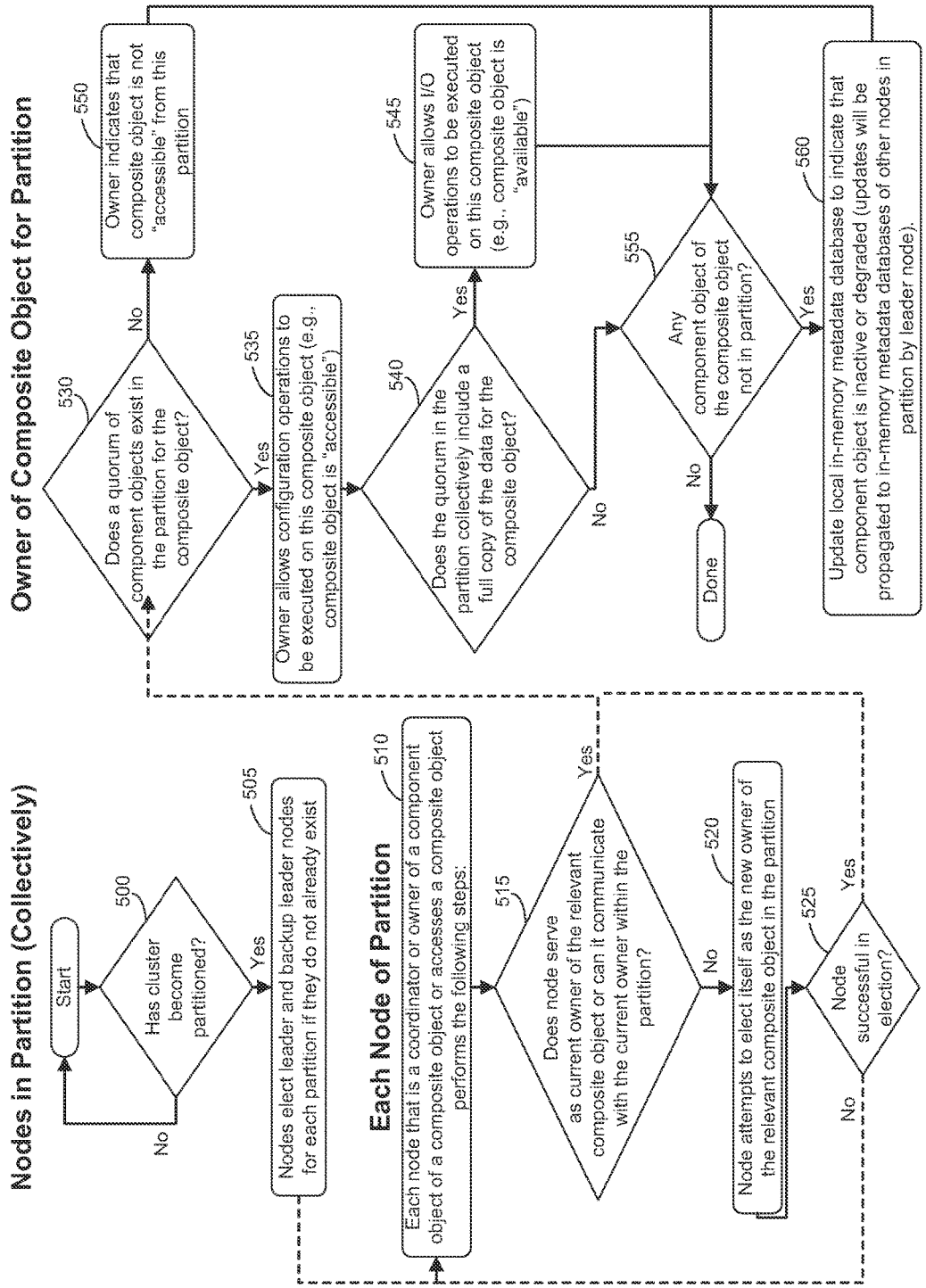
FIG. 5 illustrates a flow diagram for determining whether a composite object is accessible from a partition of a cluster of nodes, according to one embodiment.

FIG. 5 illustrates a flow diagram for determining whether a composite object is accessible from a partition of a cluster of nodes, according to one embodiment. In step 500, if one or more partitions are recognized within cluster 110 due to a node failure or other event (e.g. reconfiguration, etc.) then, in step 505, leader nodes are elected for such partitions if they do not already exist, as described, for example, in FIG. 5A). In step 510, each node in a partition that serves as a coordinator or owner for a composite or component object that has related objects (e.g., other component objects of the composite object or the composite object itself) coordinated by other nodes that are no longer accessible due to the partition (e.g., node failed or is in another partition, etc.) is notified of the lack of access to such other related objects. For example, in one embodiment that utilizes the callback mechanisms previously discussed, such a node's CMMDS sub-module 335, through its cluster monitoring activities, recognizes a change (e.g., the partition) in the state of cluster 110 that causes the lack of access to the other related objects and notifies the node's corresponding DOM sub-module 340. In step 515, if the coordinator for a composite object is not accessible from a partition, then, in step 520, each coordinator for each of component objects of the composite object in the partition attempts to elect itself as the coordinator for the composite object for the partition. In step 525, only one of the coordinators of a component object successfully elects itself as the coordinator for the composite object in the partition. In step 530, the CMMDS sub-module 335 of the node in the partition that serves as the coordinator of the composite object (either pre-existing or elected in step 525) determines whether a quorum or majority of the component objects that make up the composite object reside in nodes that are members of the partition. In one embodiment, if a composite object has an even number of component objects during its creation, the owner node of the composite object may add an odd number of "witness" component objects (generally belonging to one or more nodes in which a component object does not reside) during creation to the composite object in order to provide a quorum for a particular partition in the event of a failure event that splits cluster 110. If the coordinator of the composite object determines that a quorum or majority of the component objects that make up the composite object are stored within nodes of the partition, the coordinator node will, in step 535, update its in-memory metadata database (where such updates would be propagated to the other nodes in the partition by the leader node as previously discussed) to indicate that the composite object is "accessible" within the partition such that the owner node permits metadata or configuration operations (e.g., modifying its storage profile or policy, modifying its blueprint 215, etc.) to be performed on the composite object (e.g., all such operations generally referred to as either "configuration" or "metadata" operations). If, in step 540, the coordinator node further determines that the quorum of component objects in the partition also include a full copy of the data for the composite object, then in step 545, the owner node further updates its in-memory metadata database to indicate that the composite object is "available" within the partition such that the owner node also permits I/O operations to be performed on the composite object.

If, in step 530, the coordinator node of the composite object determines that it does not have a quorum (e.g., majority) of component objects within the partition, in step 550, it indicates in its in-memory metadata database (as propagated within the partition to the other in-memory metadata databases of the other nodes by the leader node) that the composite object is not accessible from the partition. In step 555, if any component objects of the composite object are not in the partition, in step 560, the coordinator node also updates its in-memory metadata database (and the local in-memory metadata databases of the other nodes in the partition through the leader node) to indicate that such component objects are "degraded," "inaccessible," or otherwise cannot be accessed from the partition.

It should be recognized that for each composite object in object store 116, at most one node in one particular partition that serves as the owner or coordinator of the composite object for that particular partition will validate that the composite object is accessible. It should further be recognized that embodiments that implement the foregoing partitioning techniques enable cluster 110 to experience a failure that causes partitioning and allow concurrent partitions to co-exist and possibly support I/O operations from clients such as VMs running on nodes. For example, so long as a quorum or majority of the component objects that make up composite object 200 also reside in the same particular partition and also include a full copy of the data of the composite object, a client, such as a VM running in a node within the same partition, can perform I/O operations on composite object 200 (e.g., a virtual disk object) even though cluster 110 has suffered a partitioning.

Figure 6:
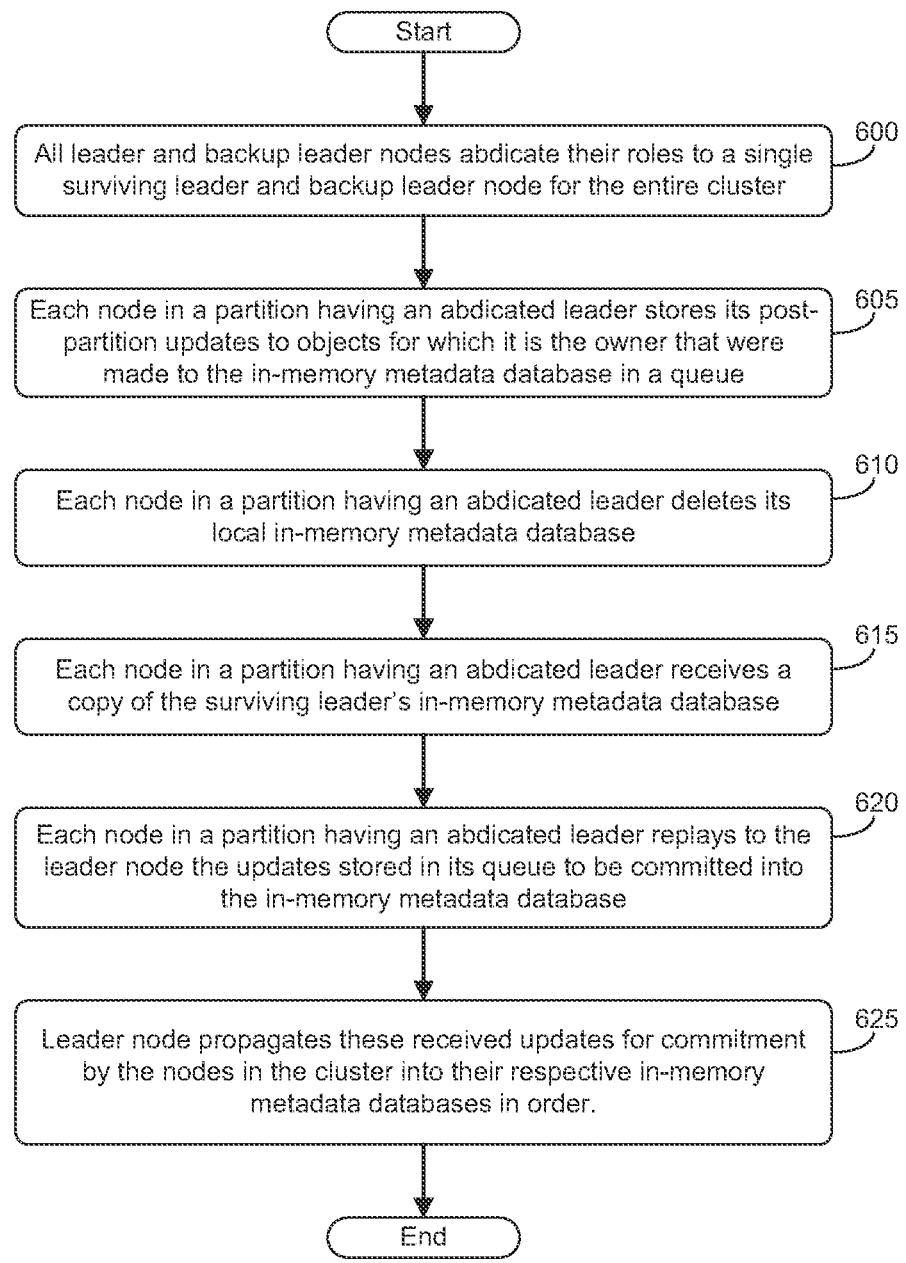
FIG. 6 illustrates a flow diagram for a reconciliation if partitions back into a single cluster of nodes, according to one embodiment

FIG. 6 illustrates a flow diagram for a reconciliation of a number of partitions back into a single cluster. When a node failure, network failure or other failure event is resolved (or a node comes back online) such that partitions are merged back into a single cluster 110, in step 600, leader and backup leader nodes of all partitions will relinquish or abdicate their roles to a single leader and backup leader node. For example, in one embodiment, the leader and backup leader nodes of the partition that has the largest node membership retain their roles while all leader and backup leader nodes of the remaining partitions abdicate their respective roles. In step 605, each node that was in a partition whose leader node abdicated its leadership role stores in a queue or log (or similar data structure) any updates (e.g., metadata operations, etc.) to objects (composite or component) made to its in-memory metadata database for which the node served as the owner node for such object. For example, if a node was the coordinator node of a composite object that added a new component object to the composite object while the node was in its partition, the node would add the metadata operation relating to the addition of the new component object to its queue. Similarly, the node that was the coordinator node for the newly created component object would likewise add an update relating to the new component object in its queue.

In one embodiment, the CMMDS sub-modules 335 maintain in the in-memory metadata database a configuration sequence identifier or number for each object in order to track any updates (e.g., metadata and I/O operations, etc.) made to such objects. For example, when a metadata operation, such as a change to virtual disk blueprint 215, is made to composite object 200, the owner node of composite object 200 may increment the configuration sequence number corresponding to composite object 200 (which may then, as previously discussed, be propagated to the rest of the nodes in cluster 110 or a partition, as the case may be, by the leader node, for example, using a two-phase commit protocol). It should be recognized, that as previously discussed, in the event of a partitioning of cluster 110, only one owner node of one partition would be able to "access" a composite object and therefore be able to increment the configuration sequence number of the composite object, thereby avoiding possible split-brain situations.

In step 610, each node that was in a partition whose leader node abdicated its leadership role then deletes its local in-memory metadata database. Deletion of the in-memory metadata database effectively removes any previous ownership roles that the node may have served for composite objects while it was in the partition. In step 615, each such node receives the in-memory metadata database of the surviving leader node. In step 620, each such node then delivers or "replays" any updates in its queue to the surviving leader node to propagate and commit (e.g., two-phase commit, etc.) into the surviving in-memory metadata database. In step 625, upon receiving all such updates from the various nodes for propagation, the leader node will, for each object corresponding to such updates, transmit and request that the updates be committed by all the nodes in the cluster in increasing order according to the configuration sequence number of the objects associated with the updates. In this manner, updates are committed to the in-memory metadata databases in the correct order.

Figure 7:
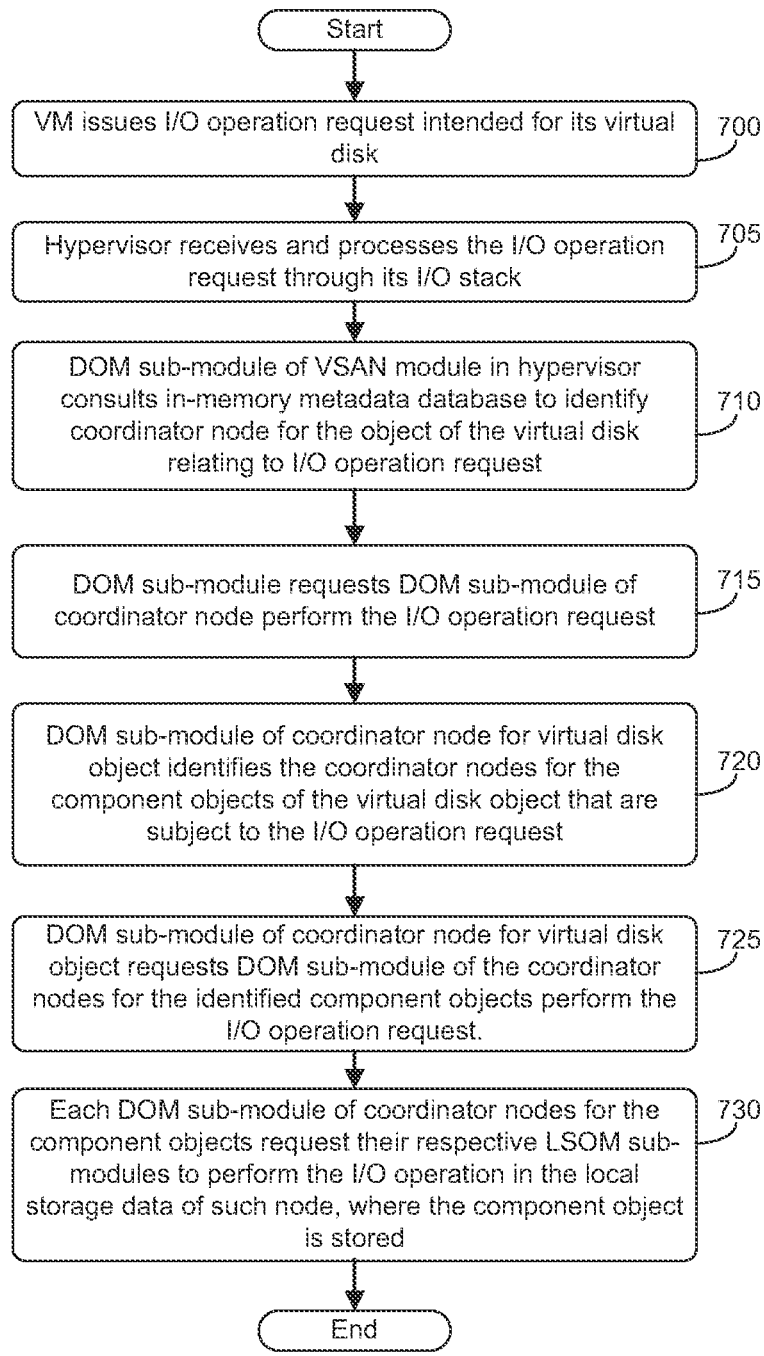
FIG. 7 illustrates the handling of an I/O operation originating from a VM, according to one embodiment.

FIG. 7 illustrates the handling of an I/O operation originating from a VM, according to one embodiment. When a VM running on a particular node performs I/O operations to its virtual disk, the VM's guest operating system, in step 700, issues an I/O operation request intended for its virtual disk (through a device driver of the guest operating system) which, in step 705, is received by hypervisor 113 and ultimately forwarded and transformed through various layers of an I/O stack in hypervisor 113 to DOM sub-module 340 of VSAN module 114. In step 710, the I/O request received by DOM sub-module 340 includes a unique identifier for an object representing the virtual disk that DOM sub-module 340 uses to identify the coordinator node of the virtual disk object by accessing the in-memory metadata database of CMMDS sub-module 335 (in certain embodiments, accessing the in-memory metadata database to look up a mapping of the identity of the coordinator node to the unique identifier occurs only when the virtual disk object is initially accessed, with such mapping persisting for future I/O operations such that subsequent lookups are not needed). Upon identifying the coordinator node for the virtual disk object, the DOM sub-module 340 of the node running the VM communicates (e.g., using its RDT sub-module 345) with the DOM sub-module 340 of the coordinator node to request that it perform the I/O operation in step 715. As previously discussed, in certain embodiment, if the node running the VM and the node serving as coordinator of the virtual disk object are different, the two DOM sub-modules will communicate to update the role of the coordinator of the virtual disk object to be the node of the running VM. Upon the coordinator's receipt of the I/O request, in step 720, its DOM sub-module identifies (e.g., by again referencing the in-memory metadata database, in certain embodiments) those coordinator nodes for the particular component objects (e.g., stripes) of the virtual disk object that are subject to the I/O operation. For example, if the I/O operation spans multiple stripes (e.g., multiple component objects) of a RAID 0 configuration, DOM sub-module 340 may split the I/O operation and appropriately transmit correspond I/O requests to the respective coordinate nodes for the relevant component objects that correspond to the two stripes. In step 725, the DOM sub-module of the coordinator node for the virtual disk object requests that the DOM sub-modules for the coordinator nodes of the identified component objects perform the I/O operation request and, in step 730, the DOM sub-modules of such coordinator nodes for the identified component objects interact with their corresponding LSOM sub-modules to perform the I/O operation in the local storage resource where the component object is stored.

Advantageously, embodiments of the present disclosure provide partition tolerance for node clusters in a distributed system on a per-object basis. In a software-based VSAN, by ensuring that a quorum of component objects exists in at most one partition, cluster partitions may co-exist such that even if a "split-brain" situation in a cluster occurs, composite objects in the cluster may still operate with a certain level of availability. It should be recognized that although the foregoing embodiments describe VSAN module 114 within a hypervisor, that alternative embodiments may implement the functionality of VSAN module 114 in other contexts, such as within a non-virtualized traditional operating system, running within a virtual appliance (e.g., inside a virtual machine) and the like. Similarly, although certain of the foregoing embodiments focused on the storage of file system objects and virtual disks objects in object store 116, it should be recognized that many other types of objects may be stored within object store 116. For example, in addition to namespace or file system objects and virtual disk objects, embodiments may further store VM swap area objects, memory checkpoint objects and any other objects in object store 116. In certain embodiments described above, the in-memory metadata database is utilized both during object creation as well as during I/O. In alternative embodiments, multiple metadata databases may be utilized. For example, in one alternative embodiment, for example, each coordinator node for an object maintains its own in-memory state for the object (e.g., as a data structure with an unmarshalled RAID tree, for example) which is used during I/O but not necessarily distributed across the nodes in cluster 110. Similarly, it should be recognized that in certain embodiments, the in-memory metadata database (e.g., including hosts, disk information as well as object metadata information) can be re-created from persistent data stored for the objects by their coordinator nodes.

Generally speaking, the various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method comprising:
   managing a cluster of computing nodes following a failure or management event that divides the cluster into at least a first partition and a second partition, wherein (i) the cluster aggregates local storage resources of each of the computing nodes to provide an object store, and (ii) each object stored in the object store represents a virtual disk associated with a corresponding virtual machine and contains data that is divided into respective data components stored across the storage resources of the respective computing nodes, wherein managing the cluster of computing nodes comprises:
   determining that a majority of data components that comprise a first object stored in the object store are stored within computing nodes in the first partition;
   determining that a majority of data components that comprise a second object stored in the object store are stored within computing nodes in the second partition;
   in response to determining that the majority of data components that comprise the first object are stored within computing nodes in the first partition, permitting configuration operations to be performed on data components of the first object stored within computing nodes in the first partition while denying any access to the first object from the second partition; and
   in response to determining that the majority of data components that comprise the second object are stored within computing nodes in the second partition, permitting configuration operations to be performed on data components of the second object stored within computing nodes in the second partition while denying any access to the second object from the first partition.

2. The method of claim 1, further comprising:
   determining that the majority of data components that comprise the first object further includes all data that comprises the first object; and
   permitting I/O operations to be performed on the first object in the first partition by a requesting process running on one of the computing nodes in the first partition.

3. The method of claim 2, wherein the requesting process is associated with a first virtual machine and the first object represents a first virtual disk for the first virtual machine.

4. The method of claim 1, wherein configuration operations include operations that modify the capacity, availability, or TOPS of an object stored in the object store.

5. The method of claim 1, wherein each of the computing nodes maintains a local copy of an in-memory database that tracks a current configuration of each object stored in the object store and indicates whether an object is accessible by the computing node.

6. The method of claim 5, further comprising, storing in a log any operations performed on the first object by computing nodes in the first partition.

7. The method of claim 6, wherein, upon a recovery from the failure event, the method further comprises:
   replacing the local copies of the in-memory database in the computing nodes of the first partition with a replacement copy of the in-memory database from a leader node of the second partition; and
   replaying the operations in the log so that the replacement copy of the in-memory database is updated to include operations performed from the first partition.

8. The method of claim 1, wherein, upon a merging of the first partition and second partition, the method further comprises, reconciling data components of the first object stored within computing nodes in the first partition with any other data component of the first object stored in the second partition.

9. The method of claim 8, wherein the reconciling step further comprises replaying updates made to the first object to a leader node of the merged cluster.

10. The method of claim 1, wherein one or more data components that comprise the first object are stored within computing nodes of the second partition of computing nodes, and wherein denying any access to the first object from the second partition includes denying access to the data components of the first object stored within computing nodes in the second partition.

11. The method of claim 1, comprising:
    determining that one or more data components, but less than a majority of data components, that comprise a third object stored the object store are stored within computing nodes in the first partition of computing nodes; and
    denying access to the data components of the third object from the first partition.

12. The method of claim 1, wherein the majority of data components that comprise the first object are stored within a plurality of storage resources associated with computing nodes in the first partition.

13. A non-transitory computer readable storage medium storing instructions, which, when executed on a processor, performs operations comprising:
- managing a cluster of computing nodes following a failure or management event that divides the cluster into at least a first partition and a second partition, wherein (i) the cluster aggregates local storage resources of each of the computing nodes to provide an object store, and (ii) each object stored in the object store represents a virtual disk associated with a corresponding virtual machine and contains data that is divided into respective data components stored across the storage resources of the respective computing nodes, wherein managing the cluster of computing nodes comprises:
- determining that a majority of data components that comprise a first object stored in the object store are stored within computing nodes in the first partition;
- determining that a majority of data components that comprise a second object stored in the object store are stored within computing nodes in the second partition;
- in response to determining that the majority of data components that comprise the first object are stored within computing nodes in the first partition, permitting configuration operations to be performed on data components of the first object stored within computing nodes in the first partition while denying any access to the first object from the second partition; and
- in response to determining that the majority of data components that comprise the second object are stored within computing nodes in the second partition, permitting configuration operations to be performed on data components of the second object stored within computing nodes in the second partition while denying any access to the second object from the first partition.

14. The computer readable storage medium of claim 13, wherein the operation further comprises:
- determining that the majority of data components that comprise the first object further includes all data that comprises the first object; and
- permitting I/O operations to be performed on the first object in the first partition by a requesting process running on one of the computing nodes in the first partition.

15. The computer readable storage medium of claim 14, wherein the requesting process is associated with a first virtual machine and the first object represents a first virtual disk for the first virtual machine.

16. The computer readable storage medium of claim 13, wherein configuration operations include operations that modify the capacity, availability, or IOPS of an object stored in the object store.

17. The computer readable storage medium of claim 13, wherein each of the computing nodes maintains a local copy of an in-memory database that tracks a current configuration of each object stored in the object store and indicates whether an object is accessible by the computing node.

18. The computer readable storage medium of claim 17, wherein the operation further comprises, storing in a log any operations performed on the first object by computing nodes in the first partition.

19. The computer readable storage medium of claim 18, wherein, upon a recovery from the failure event, the operation further comprises:
- replacing the local copies of the in-memory database in the computing nodes of the first partition with a replacement copy of the in-memory database from a leader node of the second partition; and
- replaying the operations in the log so that the replacement copy of the in-memory database is updated to include operations performed from the first partition.

20. The computer readable storage medium of claim 13, wherein, upon a merging of the first partition and second partition, the operation further comprises, reconciling data components of the first object stored within computing nodes in the first partition with any other data component of the first object stored in the second partition.

21. The computer readable storage medium of claim 20, wherein the reconciling step further comprises replaying updates made to the first object to a leader node of the merged cluster.

22. A system, comprising:
- a processor; and
- a memory hosting an application, which, when executed on the processor, performs operations comprising:
  - managing a cluster of computing nodes following a failure or management event that divides the cluster into at least a first partition and a second partition, wherein (i) the cluster aggregates local storage resources of each of the computing nodes to provide an object store, and (ii) each object stored in the object store represents a virtual disk associated with a corresponding virtual machine and contains data that is divided into respective data components stored across the storage resources of the respective computing nodes, wherein managing the cluster of computing nodes comprises
  - determining that a majority of data components that comprise a first object stored in the object store are stored within computing nodes in the first partition;
  - determining that a majority of data components that comprise a second object stored in the object store are stored within computing nodes in the second partition;
  - in response to determining that the majority of data components that comprise the first object are stored within computing nodes in the first partition, permitting configuration operations to be performed on data components of the first object stored within computing nodes in the first partition while denying any access to the first object from the second partition; and
  - in response to determining that the majority of data components that comprise the second object are stored within computing nodes in the second partition, permitting configuration operations to be performed on data components of the second object stored within computing nodes in the second partition while denying any access to the second object from the first partition.

23. The system of claim 22, wherein the operation further comprises:
- determining that the majority of data components that comprise the first object further includes all data that comprises the first object; and
- permitting I/O operations to be performed on the first object in the first partition by a requesting process running on one of the computing nodes in the first partition.

24. The system of claim 23, wherein the requesting process is associated with a first virtual machine and the first object represents a first virtual disk for the first virtual machine.

25. The system of claim 22, wherein configuration operations include operations that modify the capacity, availability, or TOPS of an object stored in the object store.

26. The system of claim 22, wherein each of the computing nodes maintains a local copy of an in-memory database that tracks a current configuration of each object stored in the object store and indicates whether an object is accessible by the computing node.

27. The system of claim 26, wherein the operation further comprises, storing in a log any operations performed on the first object by computing nodes in the first partition.

28. The system of claim 27, wherein upon a recovery from the failure event, the operation further comprises:
   replacing the local copies of the in-memory database in the computing nodes of the first partition with a replacement copy of the in-memory database from a leader node of the second partition; and
   replaying the operations in the log so that the replacement copy of the in-memory database is updated to include operations performed from the first partition.

29. The system of claim 22, wherein, upon a merging of the first partition and second partition, the operation further comprises, reconciling data components of the first object stored within computing nodes in the first partition with any other data component of the first object stored in the second partition.

30. The system of claim 29, wherein the reconciling step further comprises replaying updates made to the first object to a leader node of the merged cluster.

* * * * *